United States Patent
Li et al.

(10) Patent No.: US 9,473,943 B2
(45) Date of Patent: *Oct. 18, 2016

(54) METHODS AND APPARATUS FOR MANAGING DATA WITHIN A SECURE ELEMENT

(71) Applicant: Apple Inc., Cupertino, CA (US)

(72) Inventors: Li Li, Los Altos, CA (US); Ben-Heng Juang, Milpitas, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/639,861

(22) Filed: Mar. 5, 2015

(65) Prior Publication Data

US 2015/0181433 A1  Jun. 25, 2015

Related U.S. Application Data

(63) Continuation of application No. 13/612,641, filed on Sep. 12, 2012, now Pat. No. 8,983,543.

(51) Int. Cl.

| | |
|---|---|
| *H04M 1/66* | (2006.01) |
| *H04L 29/06* | (2006.01) |
| *G06F 13/00* | (2006.01) |
| *H04W 12/08* | (2009.01) |
| *H04W 8/22* | (2009.01) |
| *H04W 4/00* | (2009.01) |

(Continued)

(52) U.S. Cl.
CPC ............ *H04W 12/08* (2013.01); *H04L 63/083* (2013.01); *H04W 4/001* (2013.01); *H04W 8/183* (2013.01); *H04W 8/22* (2013.01); *H04W 12/06* (2013.01)

(58) Field of Classification Search
CPC ..... H04L 63/10; H04L 63/105; H04W 12/08
USPC ...................................... 455/411; 726/4, 21
See application file for complete search history.

(56) References Cited

U.S. PATENT DOCUMENTS

| | | | |
|---|---|---|---|
| 6,785,256 B2 | 8/2004 | O'neill | |
| 8,229,400 B1 * | 7/2012 | Shenvi Kuncolienkar | ......... H04M 1/67 455/411 |

(Continued)

FOREIGN PATENT DOCUMENTS

| | | |
|---|---|---|
| JP | 2006121334 A | 5/2006 |
| JP | 2011501913 A | 1/2011 |

OTHER PUBLICATIONS

Li et al., "A Survey on Mobile WiMAX", IEEE Communications Magazine (Wireless Broadband Access). Dec. 2007, pp. 70-75.

(Continued)

*Primary Examiner* — Omoniyi Obayanju
(74) *Attorney, Agent, or Firm* — Downey Brand LLP (57) ABSTRACT

Apparatus and methods for managing and sharing data across multiple access control clients in devices. In one embodiment, the access control clients comprise electronic Subscriber Identity Modules (eSIMs) disposed on an embedded Universal Integrated Circuit Card (eUICC). Each eSIM contains its own data. An Advanced Subscriber Identity Toolkit application maintained within the eUICC facilitates managing and sharing multiple eSIMs' data for various purposes such as sharing phonebook contacts or facilitating automatic switch-over between the multiple eSIMs (such as based on user context).

19 Claims, 7 Drawing Sheets

(51) Int. Cl.
*H04W 8/18* (2009.01)
*H04W 12/06* (2009.01)

(56) References Cited

U.S. PATENT DOCUMENTS

| | | | |
|---|---|---|---|
| 8,555,067 B2 | 10/2013 | Schell et al. | |
| 8,660,608 B2 | 2/2014 | Schell et al. | |
| 8,666,368 B2 | 3/2014 | Schell et al. | |
| 8,707,022 B2 | 4/2014 | Haggerty et al. | |
| 8,738,729 B2 | 5/2014 | Haggerty et al. | |
| 8,887,257 B2 | 11/2014 | Haggerty et al. | |
| 8,913,992 B2 | 12/2014 | Schell | |
| 8,924,715 B2 | 12/2014 | Schell et al. | |
| 8,996,002 B2 | 3/2015 | Rodgers et al. | |
| 9,009,475 B2 | 4/2015 | Hauck et al. | |
| 9,100,393 B2 | 8/2015 | Schell et al. | |
| 9,100,810 B2 | 8/2015 | Schell et al. | |
| 9,148,841 B2 | 9/2015 | Li et al. | |
| 2004/0005910 A1* | 1/2004 | Tom | H04M 1/0254 455/558 |
| 2009/0181662 A1 | 7/2009 | Fleischman et al. | |
| 2009/0313497 A1 | 12/2009 | Lumbroso et al. | |
| 2010/0197350 A1 | 8/2010 | Jeung | |
| 2010/0293543 A1 | 11/2010 | Erhart et al. | |
| 2012/0108206 A1 | 5/2012 | Haggerty | |
| 2012/0108295 A1 | 5/2012 | Schell et al. | |
| 2012/0190354 A1* | 7/2012 | Merrien | H04W 4/001 455/422.1 |
| 2012/0225621 A1 | 9/2012 | Li et al. | |
| 2012/0260095 A1 | 10/2012 | Von Hauck et al. | |
| 2013/0122864 A1 | 5/2013 | Haggerty et al. | |
| 2013/0205390 A1 | 8/2013 | Hauck et al. | |
| 2013/0316764 A1 | 11/2013 | Mehio et al. | |
| 2013/0329639 A1 | 12/2013 | Wietfeldt et al. | |
| 2014/0214688 A1* | 7/2014 | Weiner | G06Q 20/3227 705/71 |

OTHER PUBLICATIONS

International Search Report, PCT Application No. PCT/US2013/058818, dated Oct. 31, 2013.
Written Opinion, PCT Application No. PCT/US2013/058818, Oct. 31, 2013.
Japanese Patent Application No. 2015531990—Office Action dated Feb. 29, 2016.

* cited by examiner

METHODS AND APPARATUS FOR MANAGING DATA WITHIN A SECURE ELEMENT

CROSS-REFERENCE TO RELATED APPLICATIONS

This application is a continuation of U.S. application Ser. No. 13/612,641, filed Sep. 12, 2012, entitled "METHODS AND APPARATUS FOR MANAGING DATA WITHIN A SECURE ELEMENT," the contents of which are incorporated herein by reference in their entirety for all purposes.

FIELD

The present invention relates generally to the field of communications systems, and more particularly in one exemplary aspect, to facilitating the sharing of data between multiple user access clients of one or more mobile devices.

BACKGROUND

Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC) (also referred to as a "SIM card"). The USIM access control client authenticates the subscriber to the UMTS cellular network. After successful authentication, the subscriber is allowed access to the cellular network. As used hereinafter, the term "access control client" refers generally to a logical entity, either embodied within hardware or software or combinations thereof, suited for controlling access of a first device to a network. Common examples of access control clients include the aforementioned USIM, CDMA Subscriber Identification Modules (CSIM), IP Multimedia Services Identity Module (ISIM), Subscriber Identity Modules (SIM), Removable User Identity Modules (RUIM), etc.

Traditionally, the UICC enforces a trusted boundary for one or more USIM (or more generally "SIM") access control clients. The UICC is manufactured and "hardcoded" with a SIM i.e., once programmed, the UICC cannot be reprogrammed. If a user wants to authenticate to a cellular network using a different SIM, the user must physically exchange the SIM card in the device with a different SIM card. In response to these physical limitations, some devices have been designed to house two SIM cards at the same time, known as Dual-SIM phones. However, Dual-SIM phones do not address the fundamental physical limitations of SIM card devices. For example, information stored within one SIM card cannot be easily consolidated with information stored within another SIM card. Existing Dual-SIM devices cannot access the contents of both SIM cards simultaneously. Lastly, accessing a SIM card requires a perceptible and non-trivial amount of time for the user; switching between SIM cards to transfer information is undesirable and reduces user experience, and this limitation is present in both traditional and Dual-SIM devices.

Accordingly, new solutions are needed to increase flexibility in accessing multiple access control clients. Ideally, such solutions should allow for sharing of common user data between the multiple access control clients to enhance the user's experience. Moreover, the improved methods and apparatus should allow for seamless switching between the multiple access control clients to improve a user's access and use of cellular services.

SUMMARY

The present invention satisfies the aforementioned needs by providing, inter alia, improved apparatus and methods for sharing of data between multiple user access clients of one or more mobile devices.

In one aspect of the present invention, a secure element configured to store one or more access control clients, each of the one or more access control clients containing data, is disclosed. In one embodiment, the secure element includes a secure processor; and a secure storage device in data communication with the secure processor. In one exemplary embodiment, the storage device includes computer-executable instructions that are configured to, when executed by the secure processor: receive a request to access a first data of an inactive first access control client; verify the request; access the first data of the inactive first access control client; and return the first data.

In one variant, each of the one or more access control clients includes computer-executable instructions that are configured to, when executed by the secure processor: receive a request to authenticate an active second access control client from a network entity; authenticate the request; and when the request is authentic, respond to the network entity.

In another variant, requests to access data and network-originated requests are at distinct privilege levels.

In some variants, the request identifies a requestor. For example, the requestor may be a user. In another example, the requestor may be a software application. In one such case, the software application is resident on the secure element. In still other examples, the requestor includes a software process on a second of the one or more access control clients on the secure element.

In a second aspect, a method for processing data within a secure element configured to store one of more access control clients each containing data is disclosed. In one embodiment, the method includes: receiving a request to access a first data; verifying the request; searching a plurality of access control clients for the first data; and when the first data is found, returning the first data.

In one such variant, verifying the request includes identifying the requestor. In one such example, verifying the request further includes determining a privilege associated with the requestor. In another example, the determined privilege associated with the requestor is pre-determined by an administrative entity.

In other variants, accessing the first data includes accessing a plurality of contact information to identify a single contact.

In still other variants, the accessing the first data includes accessing one or more device configurations, the accessing enabling configuration of a device according to at least one of the one or more configurations.

In a third aspect, a secure element configured to store one of more access control clients, each of the one or more access control clients containing data is disclosed. In one embodiment, the secure element includes: means for receiving a request to access a first data; means for verifying the request; means for searching the one or more access control clients for the first data; and means for returning the first data.

In one variant, the means for verifying the request comprises means for verifying a personal identification number (PIN) or password supplied by a user.

In other variants, the means for verifying the request comprises means for determining a software privilege level of a software application.

In still other variants, the secure element includes means for receiving a network request to authenticate the access control client.

In a fourth aspect, a mobile device is disclosed. In one embodiment, the mobile device includes: a secure element, the secure element configured to store one of more access control clients, each of the one or more access control clients containing data; one or more wireless communications circuitry adapted to communicate with a communications network; a first processor; a storage device in data communication with the first processor, the storage device comprising computer-executable instructions that are configured to, when executed by the first processor: transmit a request to access a first data of a first access control client according to a first privilege, the first privilege limited to toolkit accessible data; the request configured to cause the secure element to: verify the request; access the first data of the first access control client; and return the first data to the first processor.

In a fifth aspect of the present invention, a method for accessing data within a secure element of a user device is disclosed. In one embodiment, the method includes: transmitting a request to access a first data stored on the secure element of the user device; responsive to receiving the request, the secure element verifying the request; when the request is valid, locating the first data on one of a plurality of access control clients; and receiving the first data from the secure element.

In a sixth aspect of the present invention, a mobile device is disclosed. In one embodiment, the mobile device includes: a secure element, the secure element configured to store one of more access control clients, each of the one or more access control clients containing data; one or more wireless communications circuitry adapted to communicate with a communications network; logic configured to request access to a first data of a first of one or more inactive access control clients stored on the secure element; where the secure element is configured to verify the request and when the request is valid, provide the first data of the first access control client; and logic configured to receive the first data from the secure element.

Other features and advantages of the present invention will immediately be recognized by persons of ordinary skill in the art with reference to the attached drawings and detailed description of exemplary embodiments as given below.

DETAILED DESCRIPTION

Reference is now made to the drawings wherein like numbers refer to like parts throughout.
Overview The present invention provides, inter alia, methods and apparatus for managing and sharing data across multiple user access control clients in devices. In one embodiment, an embedded Universal Integrated Circuit Card (eUICC), secure element, or UICC containing a logical entity (e.g., an Advanced Subscriber Identity Toolkit) manages and provides access to data stored across multiple electronic Subscriber Identity Modules (eSIMs). Data can consist of for example, user-defined data (UDD) (e.g., settings and data configured by a user such as phonebook contacts, eSIM usage preferences, etc.), operator specific data, calibration data, etc. The Advanced Subscriber Identity Toolkit provides a secondary privileged interface which enables faster access to data stored within the eSIM, without compromising the integrity of eSIM security.

Still other aspects of the present invention enable collaborative access control client operation. For example, in one exemplary use case, a logical entity such as the aforementioned Advanced Subscriber Identity Toolkit is configured to monitor operational or other conditions of a device, and compare them against eSIM usage preferences that have been specified by a user (or e.g., a network operator, etc.). The exemplary implementation of the Advanced Subscriber Identity Toolkit can further automatically switch the active eSIM, according to the desired preferences.

Detailed Description of Exemplary Embodiments

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any wireless network (whether cellular or otherwise) that can benefit from secure management of multiple user access control clients.

It will also be recognized that while the term "subscriber identity module" is used herein (e.g., SIM, USIM, CSIM, eSIM, etc.), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Prior Art Subscriber Identity Module (SIM) Operation—

Within the context of prior art UMTS cellular networks, a user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services. In some alternate implementations, the keys and/or cryptographic algorithms are stored within the operating system of the UICC. The USIM software is based on the Java Card™ programming language. Java Card is a subset of the Java™ programming language that has been modified for embedded "card" type devices (such as the aforementioned UICC).

Figure 1:
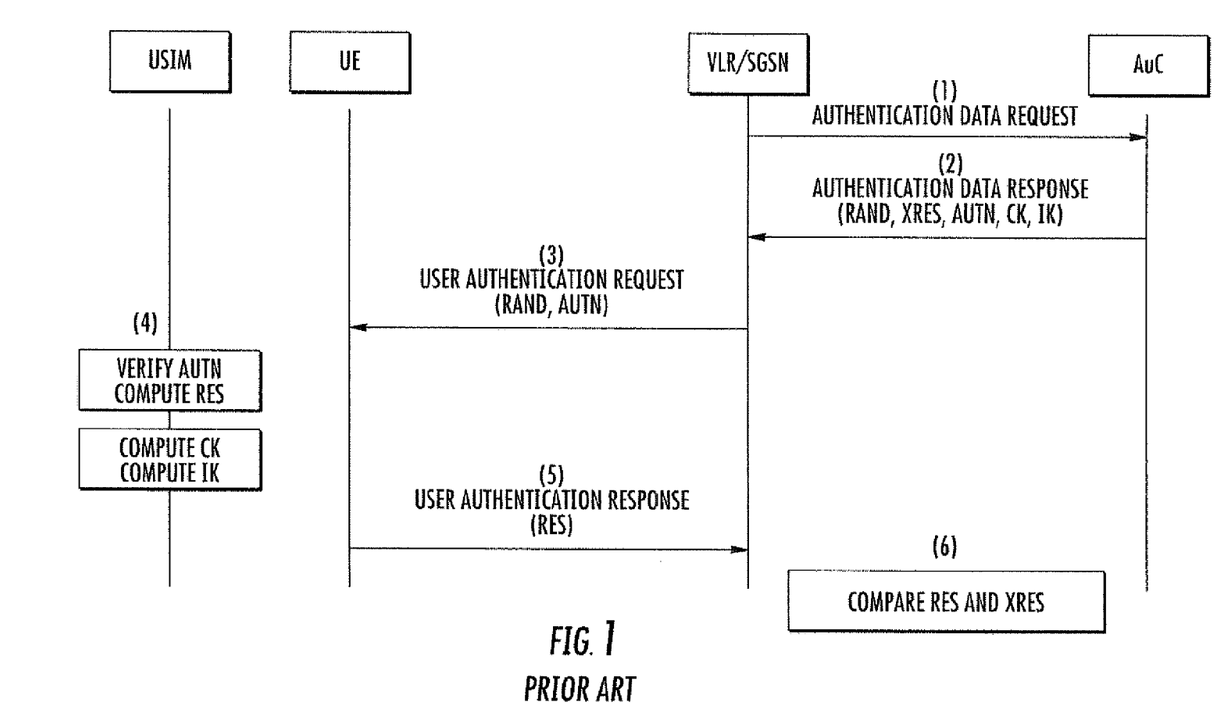
FIG. 1 graphically illustrates one exemplary Authentication and Key Agreement (AKA) procedure using a prior art USIM.

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICCID) and a specific authentication key (K). The network operator stores the association in a registry contained within the network's Authentication Center (AuC). After personalization, the UICC can be distributed to subscribers. Referring now to FIG. 1, one exemplary Authentication and Key Agreement (AKA) procedure using the aforementioned prior art USIM is illustrated in detail. During normal authentication procedures, the UE acquires the International Mobile Subscriber Identify (IMSI) from the USIM. The UE passes the IMSI to the Serving Network (SN) of the network operator or the visited core network. The SN forwards the authentication request to the AuC of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE receives the RAND and AUTN, the USIM verifies if the received AUTN is valid. If so, the UE uses the received RAND to compute its own response (RES) using the stored K and the same algorithm that generated the XRES. The UE passes the RES back to the SN. The SN compares the XRES to the received RES and if they match, the SN authorizes the UE to use the operator's wireless network services.

In addition to the UICC being programmed with a USIM, the UICC is generally programmed with other applications that provide enhanced functionality to the UICC. Common examples of such applications are a phonebook, or a USIM Application Toolkit (USAT). The USAT is typically used as a Value Added Service technology that extends the communication protocol between the UICC and the device.

Encryption/Key Schemes

Asymmetric key schemes use different keys to encrypt and decrypt messages, and thus the encrypter and decrypter do not share the same key. Symmetric key schemes utilize the same key (or trivially transformed keys) for both encryption and decryption. The Rivest, Shamir and Adleman (RSA) algorithm is one type of public/private key pair cryptography that is commonly used within the related arts, but it will be recognized that the present invention is in no way limited to the RSA algorithm. Public/private cryptography schemes can be used to encrypt a message, and/or generate signatures. Specifically, a message can be encrypted with a private key, and decrypted with the public key, thereby assuring that the message has not been altered in transit. Similarly, a signature generated with the private key can be verified with the public key, assuring that the entity generating the signature is legitimate. In both uses, the private key is kept hidden, and the public key is freely distributed.

Apparatus

As a brief aside, prior art UICCs (i.e., a SIM card) can be freely moved between mobile devices but the SIM itself is hardcoded within the UICC. While SIM cards can be pre-programmed with multiple SIMs (e.g., a USIM and a CSIM, etc.), the existing deployments generally only contain a single SIM. According to existing SIM trust architectures, the mobile device is not a trusted entity; thus, the SIM card must determine if the mobile device has been compromised before granting access. In fact, the SIM is only configured to establish trusted communications with a Home Network (FIN) or Serving Network (SN) that has access to appropriate cryptographic secrets.

Additionally, there is no mechanism in existing solutions for authenticating one SIM card to another SIM card, thus the "trust boundary" of each SIM card is limited to the card itself. Sharing information between SIM cards requires a mobile device to securely access each SIM card, and externally transfer information between SIM cards.

In contrast, in one aspect of the present invention, a secure element (UICC, eUICC, etc.), is configured to store multiple SIM elements, referred hereafter as Electronic Subscriber Identity Modules (eSIM). Each eSIM is a software emulation of a typical USIM, and contains analogous programming and user data associated therewith. In some variants, an eSIM may include additional software and/or applications in addition to the USIM applications. In one exemplary embodiment, an embedded UICC (eUICC) resident within a mobile device is configured for use with an Advanced Subscriber Identity Toolkit software layer to manage and access the multiple eSIMs stored thereon. Various embodiments of the present invention have a permanently mounted eUICC component which cannot be removed from the mobile device without great effort. Moreover, while the eUICC still enforces a trust boundary with the mobile device, the multiple eSIMs are stored internally within the eUICC trust boundary and can be securely modified and/or manipulated from within the eUICC trust boundary.

Figure 2:
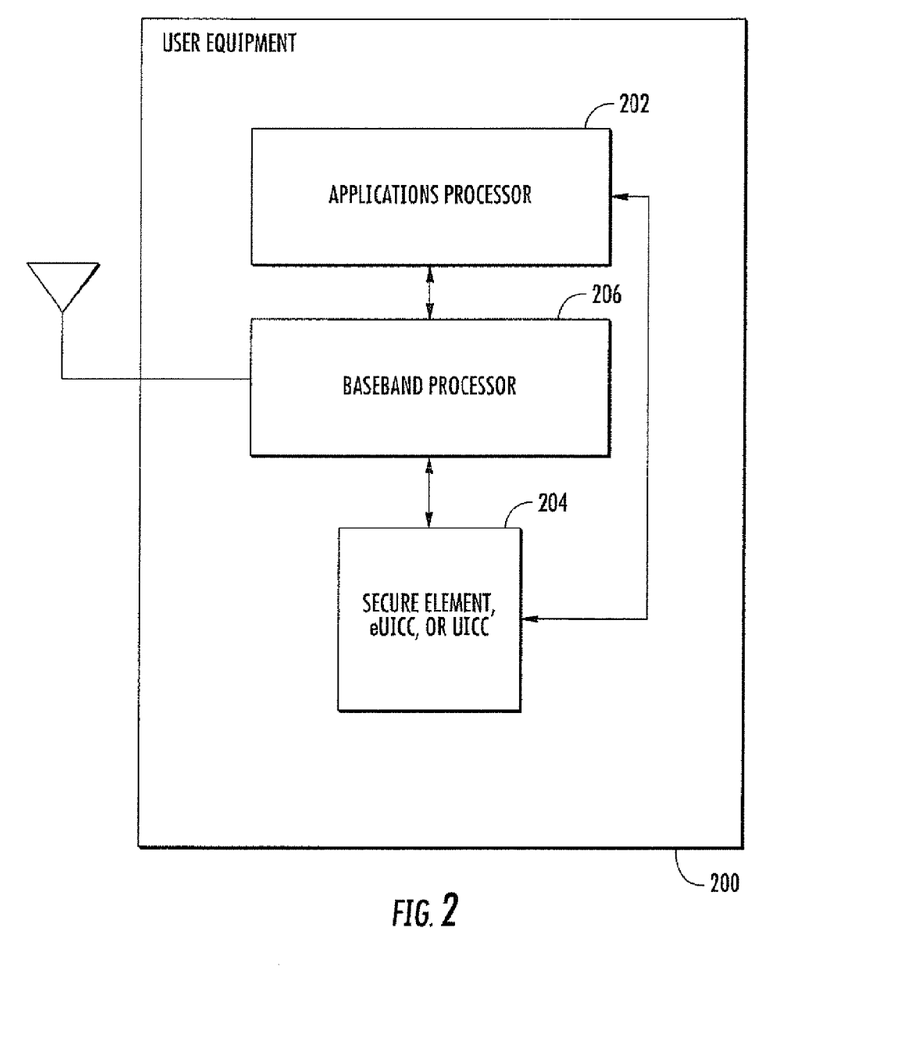
FIG. 2 is a block diagram of an exemplary embodiment of an apparatus useful for implementing the methods of the present invention.

Referring now to FIG. 2, one exemplary embodiment of an apparatus 200 useful for implementing the methods of the present invention is illustrated. The exemplary apparatus 200 includes an applications processor 202, a secure element 204, and one or more wireless interfaces and associated baseband processors 206. While shown as UMTS-compliant user equipment (UE) mobile wireless device, it will be appreciated that the apparatus 200 may take on literally any form factor or characteristics consistent with the invention.

As shown, the application processor 202 includes a digital signal processor, microprocessor, field-programmable gate array, or plurality of processing components mounted on one or more substrates. The processing subsystem may also include an internal cache memory. The processing subsystem is connected to a memory subsystem comprising memory which may for example, comprise SRAM, flash and SDRAM components. The memory subsystem may implement one or more of DMA type hardware, so as to facilitate data accesses as is well known in the art. The memory subsystem contains computer-executable instructions which are executable by the processor subsystem.

The secure element 204 includes a secure processor (e.g., secure microprocessor of the type known in the digital processing arts) and associated secure storage. The secure storage contains computer-executable instructions which are executable by the secure processor. In one such incarnation, the secure element includes a virtualized Subscriber Identity Module operation, as described in co-owned, co-pending U.S. patent application Ser. No. 12/952,089 filed on Nov. 22, 2010 and entitled "APPARATUS AND METHODS FOR PROVISIONING SUBSCRIBER IDENTITY DATA IN A WIRELESS NETWORK", Ser. No. 13/183,023 filed on Jul. 14, 2011 and entitled "VIRTUAL SUBSCRIBER IDENTITY MODULE DISTRIBUTION SYSTEM", Ser. No. 13/109,851 filed on May 17, 2011 and entitled "METHODS AND APPARATUS FOR ACCESS CONTROL CLIENT ASSISTED ROAMING", Ser. No. 13/079,614 filed on Apr. 4, 2011 and entitled "MANAGEMENT SYSTEMS FOR MULTIPLE ACCESS CONTROL ENTITIES", each previously incorporated by reference in its entirety. Unlike the other processors of the device, the secure element is isolated from other software; in particular, the secure element is permanently or semi-permanently configured to execute a code base which is known to be secure. In some variants, the secure code base cannot be modified. In other variants, the secure code base can only be modified under strict conditions (e.g., connection to a trusted party such as the manufacturer, etc.).

The secure element includes a virtual or electronic entity such as e.g., a software application, hereafter referred to as an Embedded Universal Integrated Circuit Card (eUICC). In one such variant, eUICC is capable of storing and managing multiple eSIMs. The eUICC selects an eSIM based upon the eSIM's ICCID. Once the eUICC selects the desired eSIM(s), the UE can initiate an authentication procedure to obtain wireless network services from the eSIM's corresponding network operator. While the foregoing selection is based on ICCID, those of ordinary skill will recognize that other types of identifiers may be used for eSIM management, the ICCID being purely illustrative.

In addition, the secure element includes a logical entity useful in managing a multitude of eSIMs, hereafter referred to as the "toolkit" application. In one exemplary embodiment, the toolkit application is an Advanced Subscriber Identity Toolkit software application executed internally within the secure element. Each eSIM contains its own data, such as e.g. phonebook contacts, associated phone settings, web page bookmarks, and service profiles for other devices that the apparatus may communicate with and/or use. One example of data is e.g., conditional switch-over preferences that are defined by the user (and/or network operator), and which are useful for determining which eSIM should be active on the device. For example, such switch-over preferences may be based on time of day or day of the week, physical location of the device, phonebook contact being used, an available wireless network service (e.g. voice or data cellular network service), context of use (e.g., business, personal), type of communication (e.g., voice versus data), etc.

In one embodiment, the Advanced Subscriber Identity Toolkit logical entity provides a secondary interface between the eUICC and the eSIM's data, allowing the apparatus to access any of the eSIM's data regardless of which eSIM is actively being used. As a brief aside, existing SIM cards typically require the user to satisfy an access condition (e.g., a PIN code, password, administrative code, etc.). Moreover, existing devices are prohibited from maintaining more than one active SIM at a time. Consequently, data that has been stored within a SIM card is effectively only available when the SIM card is in active use. In contrast, the exemplary Advanced Subscriber Identity Toolkit provides a secondary interface which has different privileges and/or permissions from the primary eSIM accesses. For example, the apparatus can use the Advanced Subscriber Identity Toolkit to query and share phonebook contacts across multiple eSIMs with the apparatus. In another example, the Advanced Subscriber Identity Toolkit may be used to facilitate automatic and substantially seamless switch-over between different eSIMs by monitoring one or more conditions and comparing the monitored conditions against user-defined switch-over preferences.

In one exemplary embodiment, the secure element 204 is only directly accessible by the baseband processor(s) 206. In such embodiments, the application processor 202 only has indirect access to the secure element (including the toolkit application and access control clients), via the baseband processor. In an alternate embodiment, however, both the application processor 202 and baseband processor(s) 206 are in direct communication with the secure element 204. A benefit of allowing the application processor 202 to communicate directly with the secure element 204 is enhanced flexibility in how the application processor 202 can store and retrieve data. However, it should be appreciated by those of ordinary skill in the related arts that various aspects of the present invention are directed to providing: (i) multiple layers of access control, and (ii) concurrent access. Thus, in some embodiments, the application processor can directly access the toolkit application, without affecting the primary access control client interface. For example, a user may be able to search for contact information in any eSIM, without necessarily (operationally) switching to a different eSIM.

In one exemplary implementation of the present invention, the device includes multiple wireless interfaces and baseband processors 206 adapted to connect to multiple wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems. It will be appreciated, however, that the multiple interfaces may be homogeneous or heterogeneous; e.g., the device may have two CDMA interfaces, a CDMA interface and an LTE interface, a WiMAX interface and a CDMA interface, and so forth.

Additionally, in various embodiments, the apparatus 200 may comprise a user interface subsystem including any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

Referring now back to FIG. 2, in one exemplary embodiment, the secure element 204 includes a non-transitory computer readable medium which stores one or more computer programs. The one or more computer programs are configured to implement a first level of trust (or privileges) and/or access protocol which is different than the level of trust and access protocol required to access the access control clients (e.g., eSIM(s)). In one variant, the first level of trust and (or privileges) enables software access to the Advanced Subscriber Identity Toolkit software, and is based on e.g., asymmetric or symmetric key/challenge schemes. For example, the application processor 202 may need to properly respond to a challenge and response scheme to verify itself as a valid software entity. In other variants, the access protocol may be based on a properly signed digital certificate, or other form of 3rd party verification (e.g., the processor presents a valid certificate and can thereafter access the Advanced Subscriber Identity Toolkit software). In still other variants, eUICC may be configured to check a hardware-specific signature, hardcoded device or component identifier (e.g., a processor ID, etc.), etc. In yet other variants, the Advanced Subscriber Identity Toolkit may be limited in capabilities, such that a lower degree of privileges (or generic privileges) can be used during access.

In one such exemplary variant, the Advanced Subscriber Identity Toolkit is configured with fewer restrictions and faster capabilities (than existing eSIM accesses) for certain types of accesses. In some cases, the reduced restrictions still require higher levels of administrative privileges over generic user privileges. Those of ordinary skill in the related arts will readily appreciate that various types of information stored associated with an eSIM may be handled with different degrees of security; for example, network-specific cryptography may be very tightly protected and controlled, whereas individual user data may be protected with lower degrees of protection, while generic or ubiquitous data is given no protection at all. While existing SIM cards only provide a single access protocol (and thus always require the highest level of security, even for trivial transactions), a second (or even third) access protocol for the Advanced Subscriber Identity Toolkit can be matched commensurate to the privilege levels of the associated transaction (i.e., trivial transactions may be performed with generic privileges).

For example, consider an Advanced Subscriber Identity Toolkit that is limited to adding, deleting, and/or retrieving contact information, and/or manipulating call and/or messaging history. While user information is confidential and should be protected, it is appreciated that existing security and administrative privileges that are managed by the user are generally sufficient for protecting user information. Accordingly, access to the foregoing Advanced Subscriber Identity Toolkit can be protected in the same manner (e.g., via a user determined password, etc.). In some variants, the Advanced Subscriber Identity Toolkit may further include more stringent security levels for e.g., accounting and/or billing information. For example, an administrative privilege may be required to view billing information. Moreover, in some variants, a master administrative privilege may be provided for e.g., service technicians, and/or other specially trained personnel.

In still another embodiment, the Advanced Subscriber Identity Toolkit is configured to provide access to a common set of data by both eSIMs, and/or freely access the eSIM data set for each eSIM. In one implementation, the eUICC is configured with a first section of memory for network data and eSIM data, and a second section of memory for user data. In this manner, each eSIM has access to the common section of memory while still preserving its own individual memory. In other implementations, the eUICC is configured such that each eSIM has a distinct memory space. In either implementation, the Advanced Subscriber Identity Toolkit can be used to manage access to user data.

Figure 3:
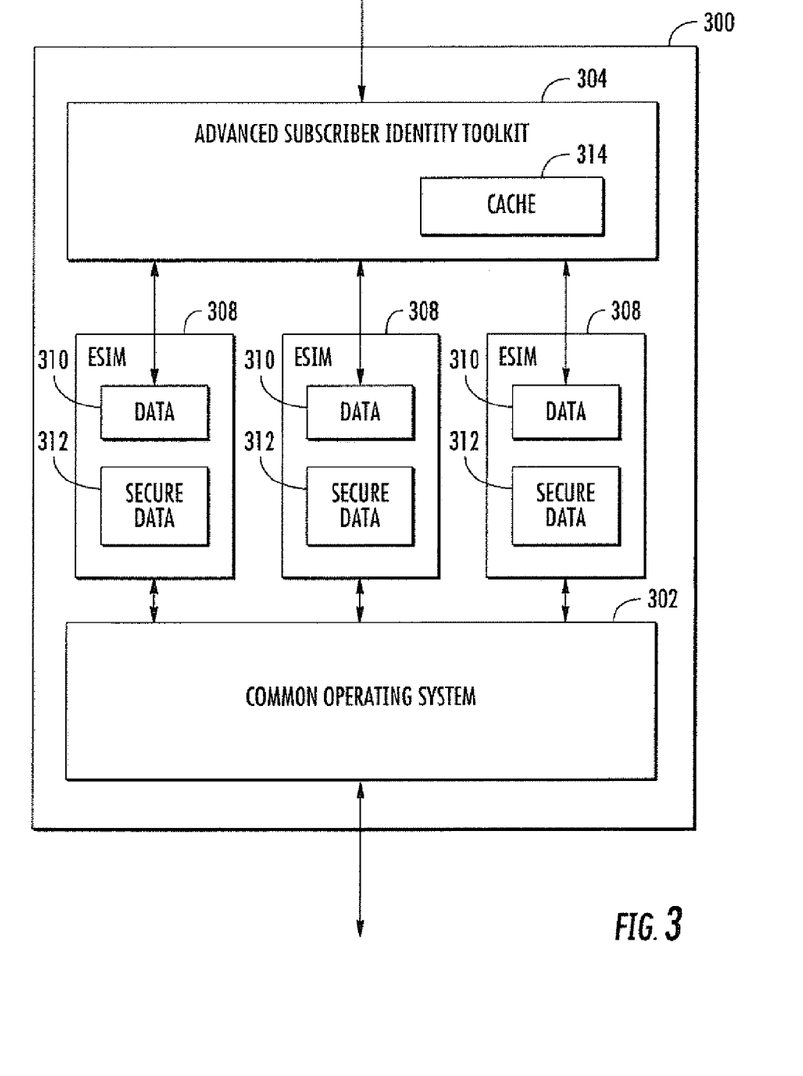
FIG. 3 is a logical representation of an exemplary embodiment of an embedded Universal Integrated Circuit Card (UICC), according to various aspects of the present invention.

FIG. 3 illustrates a logical block diagram of one exemplary embodiment of an embedded Universal Integrated Circuit Card (UICC). As shown, the eUICC 300 includes a first interface for eSIM access via an existing Common Operating System 302 (which enables SIM procedures for both user data access, and non-user data access), and a second interface which is in communication with the Advanced Subscriber Identity Toolkit 304. Each eSIM 308 has both toolkit accessible data 310 (e.g., user-defined data, applications, etc.), and non-toolkit accessible data 312 (e.g., cryptographic information, protected software, etc.). The Advanced Subscriber Identity Toolkit is configured to freely access the toolkit accessible portion of each eSIM. Additionally, the Advanced Subscriber Identity Toolkit may have access to an internal (or external) common memory cache 306 for caching data, etc.

In some embodiments, the Advanced Subscriber Identity Toolkit 304 may additionally enable a first eSIM to communicate and/or transact data with a second eSIM. For example, a first eSIM 308 can issue a request for the user data 310 of a second eSIM. Generally, it is assumed that the owner of the device owns the first and the second eSIMs, thus the Advanced Subscriber Identity Toolkit may grant the request without verification. However, in some variants, the Advanced Subscriber Identity Toolkit can additionally verify that the first eSIM has appropriate privileges for accessing the second eSIM. Such variants may be useful where a device is shared between multiple owners, etc.

As shown, the first interface for the Common Operating System 302 and the second interface for the Advanced Subscriber Identity Toolkit 304 are logically distinct, however it is appreciated that the first and second interfaces may be implemented over either a single physical interface, or distinct physical interfaces. In some embodiments, the first and second interfaces may be coupled to the baseband processor 206. In other embodiments, the first interface is coupled to the baseband processor 206, and the second interface is coupled to the application processor 202.

Methods

Figure 4:
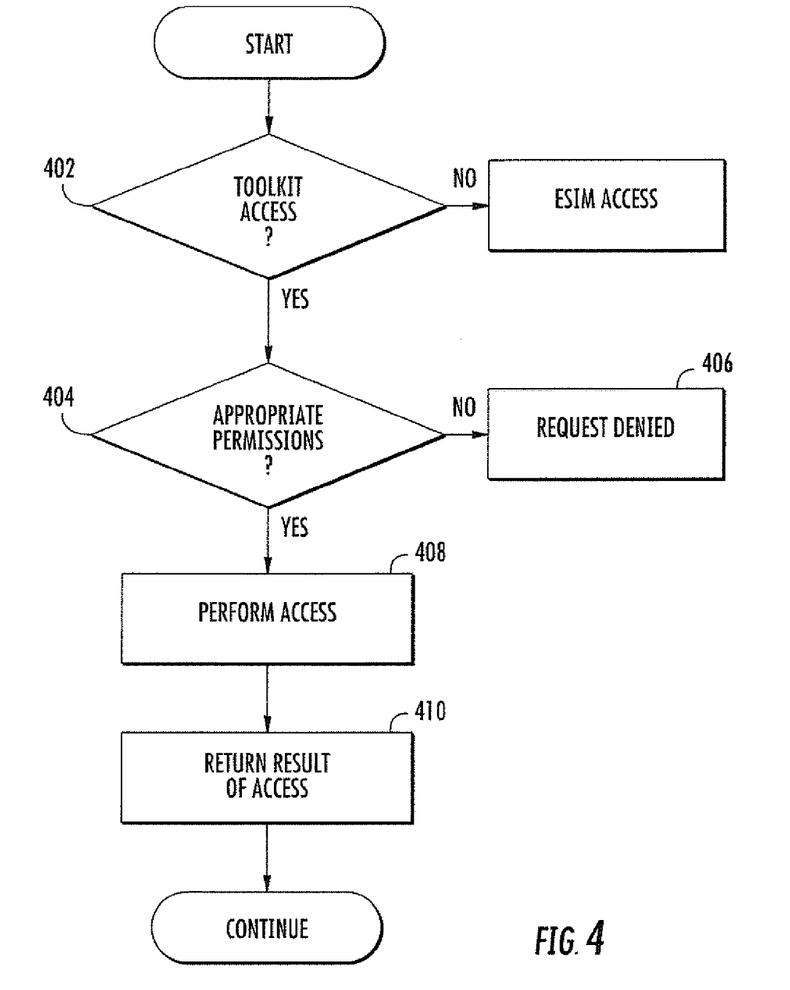
FIG. 4 is a logical flow diagram of one embodiment of a generalized method for the management of data within a secure element, according to various aspects of the present invention.

Referring now to FIG. 4, one embodiment of a generalized method for the management of data within a secure element is described. In one implementation of the present invention, one or more access control clients are capable of storing and retrieving data which is uniquely associated to that access control client. The toolkit application residing within the secure element provides an additional software management layer over the multiple access control clients. The toolkit application has for example a first privilege level, and the one or more access control clients have a second privilege level. In one variant, data can be accessed with either the first or the second privilege levels.

At step 402 of the method 400, the secure element determines if an access is directed to a toolkit application, or one or more access control clients. If the access is directed to an access control client (e.g., an eSIM), then the secure element provides access to the access control client via e.g., ISO 7816, ISO 14443, USB, etc. Otherwise, if the access is directed to the toolkit application, then the method proceeds to step 404.

In one embodiment, the secure element has a single interface which is logically divided into (i) the toolkit application, and (ii) the access control client applications. For example, SIM card interfaces typically include a clock, a reset, and a single input/output (IO). The IO line is clocked to read and write (which can be interpreted as data, address, and/or instructions). The toolkit application may be provided with a series of specialized commands, a distinct memory address space, an operational mode switch, etc. For instance, a secure element may have a single common interface which accepts both SIM card accesses and toolkit application accesses. In other exemplary configurations, the secure element is physically or logically switched between SIM card accesses and toolkit application accesses (e.g., by writing to a selection register, setting a mode switch, etc.).

In other embodiments, the secure element is provided with a distinct physical interface for each of the toolkit application and the access control client applications (i.e., two interfaces). For example, as previously indicated, a SIM card interface may include a clock, a reset, and a single input/output (IO), whereas a separate address and data bus are used for toolkit access. It will also be appreciated that the two or more interfaces may share one or more common features (e.g., share a clock and reset, yet utilize separate data/address busses).

In one variant, the requestor is a user. For example, a user may request access to phonebook contacts associated with any (or a subset) of the one or more access control clients. Generally, it is appreciated that a user will perform such requests via a Graphical User Interface (GUI) executed from the applications processor; however, other forms of interface are possible consistent with the invention. For example, the device may have an exposed button or other physical means for triggering certain operations (e.g., SIM lock, SIM swap, etc.).

In another variant, the requestor may be a software application executing on a processor of the device. For example, when eSIM data is used in order to facilitate automatic switch-over between multiple eSIMs, a baseband processor and/or modem of the host radio device (e.g., smart phone) may request stored data switch-over criteria for each eSIM to assist in automatically determining which particular eSIM should be active on the device. In other examples, eSIM data can be requested by an application processor to assist in personal contact information management, etc.

In still another variant, the requestor may be software executed internally by the eSIM itself, or another eSIM. For example, a first eSIM may request synchronization of personal contact information with a second eSIM. In still other examples, a first eSIM may automatically configure itself in accordance with device settings associated with a second eSIM, such as upon initial addition of the first eSIM to a UICC.

Those of ordinary skill in the related arts will recognize that software spans a wide range of functionalities, capabilities, and/or privileges. Common examples of software include, without limitation: firmware, low-level device drivers, operating system (OS) drivers, native device applications, 3rd party software applications, networked applications, and virtual machines. Accordingly, in some embodiments of the present invention, the toolkit application may further expose different software capabilities, based on the requestor software type. For example, a low-level device driver may be afforded different capabilities and functions than e.g., a networked application.

As a brief aside, common examples of data include, without limitation: conditional operational criteria for access control clients (e.g., settings for automatic SIM switching, etc.), website bookmarks, account password lists, call and/or messaging history, user or financial account information, device profile settings, software applications, etc.

Common examples of supported data accesses include, but are not limited to: retrieving data, storing data, modifying data (e.g., writing over or replacing it), executing instructions, determining data validity (e.g., performing a cyclic redundancy check (CRC), one-way cryptographic hash, or other integrity check), enabling/disabling features, etc. Moreover, it is appreciated that certain types of accesses may be complex and/or require the toolkit application to perform multiple internal transactions. In fact, one salient advantage of the exemplary toolkit application disclosed herein is that complex transactions can be performed internal to the secure element. Existing SIM card access is performed via ISO 7816 signaling which is much slower than the secure element's own internal access. For example, a simple read request via the ICC ISO 7816 protocol is based on a negotiated speed which can maximally reach up to several hundred kbps (kilobits per second).

At step 404, the request to access the data is optionally verified for appropriate permissions, privileges, and/or behavior by the toolkit application. More generally, the toolkit application only performs accesses commensurate with the level of privilege afforded to the requestor; this limitation ensures that the trust boundary of the secure element and access control clients cannot be circumvented by inadvertent or malicious use of the toolkit application. In one embodiment, the toolkit application only accesses a subset of the entire secure element's assets. In one variant, the subset is limited to the data corresponding to the requestor's privilege. In other variants, the toolkit application itself has a maximum privilege level. For example, the toolkit application may only be able to access/modify user-defined data.

For example, a user may request a merge of a first phonebook associated with a first eSIM and a second phonebook associated with a second eSIM; the toolkit application may additionally require (or prompt the user for) an appropriate access PIN for one or both of the eSIMs. In other examples, the user may request access to billing information associated with an eSIM. Responsively, the toolkit application may prompt the user for a password (or PIN) before providing credit card information. In still another example, a 3rd party application may request eSIM user data to enable certain functionality (e.g., in-app payment, usage history statistics, etc.), the toolkit application may verify that the 3rd party application has been granted permission to access the user's personal information before providing the requested data.

If the toolkit application determines there is insufficient permission to access data, then the request for access is denied (step 406). In some variants, an error message may be provided to the requesting entity (e.g., user, software, network entity, etc.). Otherwise, when the toolkit application determines there is sufficient permission, the request for access is granted (step 408).

Furthermore, those of ordinary skill in the related arts will recognize that the sensitive nature of access control client contents may require additional layers of security so as to prevent malicious attacks. For example, various embodiments of the present invention may be configured to additionally perform, inter alia, input validation (i.e., requests are well-formed and comply with expected inputs), authentication/authorization, integrity checks, session management (e.g., a session does not remain open or access assets improperly, etc.), exception management (i.e., error conditions are handled properly), and/or auditing/logging.

In another example, a request can be authorized according to a certificate. For example, the requestor software may be required to present a certificate that has been signed by a trusted 3rd party, which indicates that the requestor software is authorized for the requested access. One example of such a certificate includes a signature (of a trusted 3rd party) which has been hashed with a software identification and/or device identification. In another such example, the request is verified according to the requester software privilege level. For example, consider a system where the operating system has a first privilege level, 3rd party software has a second privilege level, and the communications software stack has yet another privilege level. In some variants, the user may be additionally able to configure one or more privilege levels (e.g., to grant certain 3rd party applications more access, or revoke privileges therefrom).

In still other cases, the application toolkit may verify that the requester software is operating in accordance with acceptable behavior. Common checks include, without limitation: verifying input for conformance to format and length, session timeout functions, proper memory operation (e.g., preventing runaway pointers, etc.), etc.

At step 408 of the method 400, the toolkit application accesses the requested data of the access control client. In one embodiment, the toolkit application accesses the memory space of the appropriate access control client directly. For example, a memory-mapped file structure is typically arranged according to predefined partitions. In one such variant, the partitions are divided into: (i) user defined data (UDD), and (ii) non-user data (e.g., cryptographic data, software, firmware, etc.). To perform an access, the toolkit determines the appropriate memory address from a previously cached directory structure, or by traversing the directory structure iteratively until the memory location is found. In alternate embodiments, the toolkit application accesses the access control client via a set of access control client-specific instructions. SIM type file structures are commonly obfuscated to prevent straightforward access of stored data. Thus, in some embodiments, the toolkit application must access the file structure using the SIM device's native command set. While such indirect access may require more time than direct access methods, the toolkit interface advantageously does not require many of the protocol safeguards which would otherwise have to be performed utilizing prior art techniques.

In some embodiments, the toolkit application accesses a common memory space. Common memory spaces can be pre-cached ahead of time with data, or may be populated on an as-needed or as-used basis. Generally, cache memory is smaller and faster to access than traditional memory structures, but must be optimized to reduce cache "misses" (when the cache has useful data) and maximize cache "hits" (when the cache does not have useful data). To these ends, cache memories implement different replacement policies; specifically, on a cache miss, the cache may replace one of its existing entries with the retrieved valid data. Replacement policies determine which existing cache entry is least likely to be used in the future. In one variant, the cache replaces entries according to a least-recently used (LRU) paradigm i.e., on a cache miss, the cache replaces the least recently accessed entry with the data that is retrieved from e.g., the access control client.

At step 410, the result of the access is returned to the requestor. In some variants, the toolkit application may additionally log accesses, update the cache, and/or provide log information to the access control client.

Those of ordinary skill in the related arts, given the contents of the present disclosure, will recognize that various aspects of the present invention provide access to data via an internally controlled toolkit application which is securely executed within the secure element (and which can be inherently trusted).

Example Phonebook Merge

Figure 5:
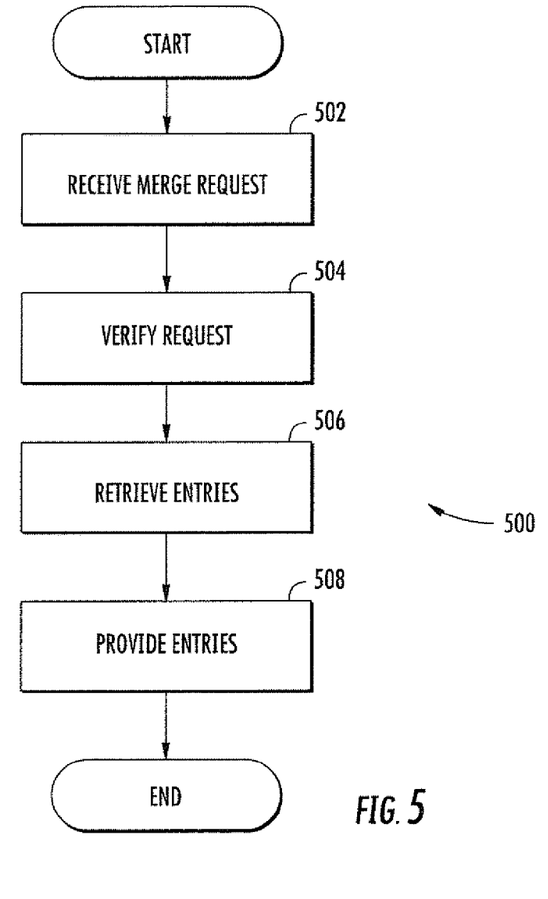
FIG. 5 is a logical flow diagram of one embodiment of a method for merging user-defined contact information of multiple electronic Subscriber Identity Modules (eSIMs) according to the present invention.

FIG. 5 illustrates one particular implementation of a method 500 for merging user-defined contact information of multiple electronic Subscriber Identity Modules (eSIMs). Consider the scenario where eSIM A has a phonebook with 200 entries, and eSIM B has a phonebook with 300 entries, and eSIM A and eSIM B have 100 overlapping entries.

At step 502, a user of a smart phone (such as for example the exemplary iPhone™ manufactured by the Assignee hereof) identifies two (2) eSIMs (eSIM A, eSIM B), and issues a request to merge the contact information of the two eSIMs via a graphical user interface (GUI) executed from an application processor. In this example, the request is directed to an Advanced Subscriber Identity Toolkit application which is executed from the embedded Universal Integrated Circuit Card (eUICC) secure element.

At step 504, the Advanced Subscriber Identity Toolkit verifies that the requesting user has the appropriate privileges to merge the contact information. Verification of privilege may be based on e.g., a user supplied PIN (or PINs), password, trusted credential provided by a 3rd party authenticator, etc. It will be appreciated however that such verification of the user's privilege may be unnecessary and skipped in certain cases if desired.

At step 506, the Advanced Subscriber Identity Toolkit retrieves the 200 entries from eSIM A and the 300 entries from eSIM B, and performs an internal merge of the entries. It is worth noting that prior art Dual-SIM devices would necessarily need to authenticate to the first SIM card to read out the first set of entries, and subsequently thereafter authenticate to the second SIM card to read out the second set of entries. Worse still, prior art solutions would be required to perform the foregoing operations entirely over the ISO 7816 card interface which, as previously noted, is significantly slower than the internal memory access afforded by the toolkit application.

Referring back to FIG. 5, at step 508, the Advanced Subscriber Identity Toolkit returns the merged list of 400 entries which are stored in memory (e.g., by the application processor). The user is notified once the merge is completed.

Example Contact Lookup

Figure 6:
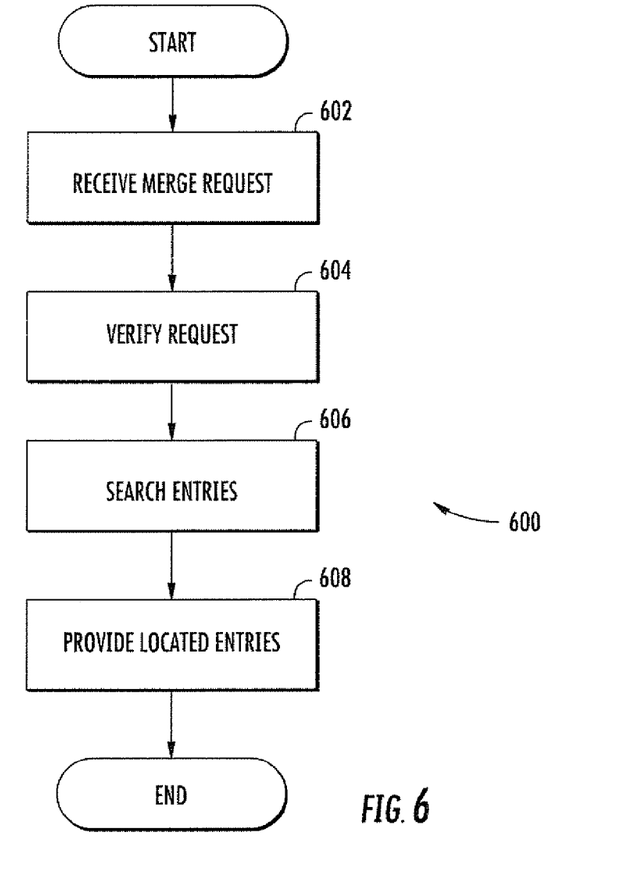
FIG. 6 is a logical flow diagram illustrating one embodiment of a method for searching for contact information within multiple electronic Subscriber Identity Modules (eSIMs) according to the present invention.

FIG. 6 illustrates one particular implementation of a method 600 for searching for contact information within one or more electronic Subscriber Identity Modules (eSIMs).

At step 602, a user of a smart phone requests contact information for "John Doe". In this example, the user has not provided a target eSIM, however it is appreciated that where the user has provided a target eSIM, the search can be significantly constrained.

If necessary, at step 604, the Advanced Subscriber Identity Toolkit verifies that the requesting user (or requesting application) has the appropriate privileges to search for the indicated contact. In some variants, the Advanced Subscriber Identity Toolkit may identify the subset of eSIMs which are searchable, based on the requesting user's (or application's) permissions.

At step 606, the Advanced Subscriber Identity Toolkit searches the eSIMs for matching entries. As a brief aside, while existing SIM cards allow single entry access, in this particular scenario, prior art software would be required to read the entire set of contacts to perform a search in the application processor. Specifically, an index is unknown for a particular entry, existing software has to read the entire set of entries out of the UICC and perform a search among the entries that were read out.

Referring back to FIG. 6, at step 608, the Advanced Subscriber Identity Toolkit returns the located contact information results to the requesting user or application.

Example Switchover Operation

Figure 7:
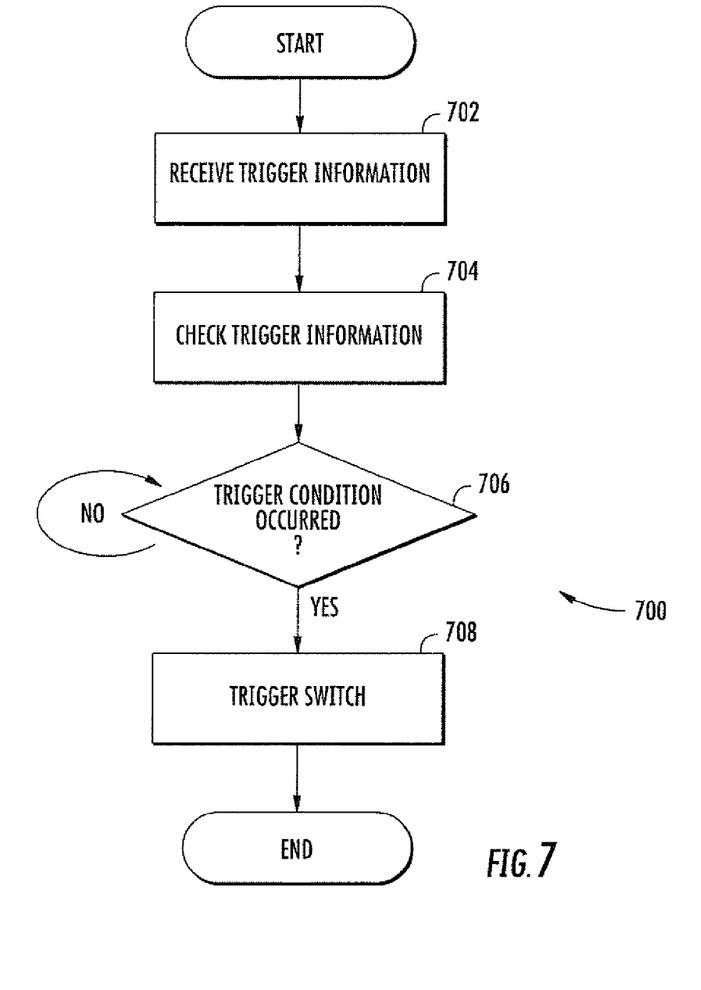
FIG. 7 is a logical flow diagram illustrating one embodiment of a method for facilitating automatic switch-over between electronic Subscriber Identity Modules (eSIMs) based on a user-defined conditional trigger, according to the present invention.

FIG. 7 illustrates one particular implementation of the method of 700 for facilitating automatic switch-over between electronic Subscriber Identity Modules (eSIMs) based on a user-defined conditional trigger.

At step 702 of the method 700, a user of a smart phone defines a conditional trigger to automatically switch between eSIMs at a particular time of day corresponding to e.g., a use or other context. For example, a user may elect to enable a first eSIM A between 7:00 AM to 5:00 PM (e.g., a work account), and a second eSIM B between 5:00 PM to 7:00 AM (e.g., a personal account). The switch-over conditional trigger is stored as user preference data within each respective eSIM.

At step 704, the Advanced Subscriber Identity Toolkit checks the user preference data conditional triggers for validity. For example, the Advanced Subscriber Identity Toolkit may ensure that one, and only one, eSIM is defined for all times (i.e., that there are no overlaps). If the conditional triggers are valid, then the Advanced Subscriber Identity Toolkit configures its triggering capability, and configures each of the eSIMs appropriately (i.e., ensuring that the eSIMs are enabled at their appropriate time of use, or that the changeover is not performed in the middle of an operational transaction such as a call or download).

Those of ordinary skill in the related arts will recognize that prior art SIM cards do not have the foregoing capabilities. Moreover, prior art Dual-SIM devices also cannot collaborate in this manner, as both SIM cards are distinct logical entities which are unable to cooperate with, or dictate or influence the operation of, the other.

At step 706, the Advanced Subscriber Identity Toolkit monitors for the triggering condition (e.g., a time, an event, etc.). For example, when the time of day (according to an internal clock reference, or per external network signaling) satisfies the 5:00 PM condition, the Advanced Subscriber Identity Toolkit swaps from the first eSIM A to the second eSIM B; similarly, when the 7:00 PM condition is satisfied, the Advanced Subscriber Identity toolkit swaps from the second eSIM B to the first eSIM A.

In some variants, the eUICC (or the Advanced Subscriber Identity Toolkit) issues a "refresh" instruction to the baseband processor; responsively the baseband refreshes to the file structure of the new eSIM and performs AKA procedures. In some cases, any such action that is invoked during an ongoing operational condition, such as a call, may be suspended or postponed until the completion of that condition.

It will also be appreciated that accesses to the eSIM "phonebook" of the example of FIG. 5 herein may be used as a triggering condition for a context (and hence eSIM) change. For example, a user's phonebook application running on the application processor may have certain contacts marked or designated as "personal", and others as "business". All user business contacts may be disposed on a business eSIM, and all personal contacts are on a personal eSIM; accordingly, a user selection of a contact may invoke the Toolkit to select a particular eSIM or "identity" if not already in use.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A mobile device, comprising:
   a wireless interface adapted to communicate with at least one wireless network; and
   a secure element, comprising:
      a first access control client comprising first data and a second access control client comprising second data,
      a logical entity configured to manage access to the first data and to the second data according to a first privilege level, wherein the first privilege level is limited to adding, deleting, and/or retrieving contact information, and/or manipulating call and/or messaging history, and
      a processor that causes the secure element to:
         receive, from a requestor, a request to access the first data,
         determine whether the request satisfies a trigger condition,
         determine privilege information associated with the requestor,
         verify the request based on the privilege information,
         select, when the request satisfies the trigger condition, the first access control client if the first access control client is not already in use, wherein the processor causes the secure element to select, at least in part, by performing an authentication and key agreement (AKA) procedure with a network entity,
         access the first data based on the first privilege level, and
         provide a portion of the first data to the requestor.

2. The mobile device of claim 1, wherein the requestor comprises a user.

3. The mobile device of claim 2, wherein to verify the request the processor further causes the secure element to verify a personal identification number (PIN) or password supplied by the user.

4. The mobile device of claim 1, wherein the requestor comprises a software application.

5. The mobile device of claim 4, wherein the software application is resident on the secure element.

6. The mobile device of claim 1, wherein the requestor comprises a software process that is resident on the second access control client.

7. The mobile device of claim 1, wherein the request is to merge the first data and the second data, and the processor further causes the secure element to:
- access the second data based on the first privilege level, and
- merge the first data and the second data.

8. The mobile device of claim 1, wherein the request is for first contact information of a particular individual, and the processor further causes the secure element to:
- identify an access control client on the secure element to be searched for the first contact information based on the privilege information.

9. A method by a secure element, wherein the secure element comprises a logical entity, a first access control client and a second access control client, the method comprising:
- receiving, from a requestor, a request to access first data, wherein the first access control client comprises the first data, wherein the logical entity is configured to manage access to the first data according to a first privilege level, wherein the first privilege level is limited to adding, deleting, and/or retrieving contact information, and/or manipulating call and/or messaging history;
- determining whether the request satisfies a trigger condition;
- determining whether the requestor has permission to access the first data based on a requestor privilege level associated with the requestor; and
- in response to a determination that the requestor has the permission to access the first data:
  - selecting, when the request satisfies the trigger condition, the first access control client if the first access control client is not already in use wherein selecting comprises performing an authentication and key agreement (AKA) procedure with a network entity,
  - accessing the first data based on the first privilege level, and
  - providing a portion of the first data to the requestor.

10. The method of claim 9, wherein the requestor comprises a software application resident on the secure element.

11. The method of claim 9, wherein the requestor comprises a software process that is resident on the second access control client.

12. The method of claim 9, wherein the requestor privilege level is pre-determined by an administrative entity.

13. The method of claim 9, further comprising:
- searching among a plurality of access control clients on the secure element to locate the first data.

14. A secure element included in a mobile device, comprising:
- a first access control client comprising first data;
- a second access control client comprising second data;
- a logical entity; and
- a processor that causes the secure element to:
  - receive, from a requestor, a request to access the first data, wherein the logical entity is configured to manage access to the first data and to the second data according to a first privilege level, wherein the first privilege level is limited to adding, deleting, and/or retrieving contact information, and/or manipulating call and/or messaging history, and the requestor is associated with a requestor privilege level,
  - determine whether the request satisfies a trigger condition,
  - select, when the request satisfies the trigger condition, the first access control client if the first access control client is not already in use, wherein the processor causes the secure element to select, at least in part, by performing an authentication and key agreement (AKA) procedure with a network entity,
  - access the first data based on the first privilege level and the requestor privilege level, and
  - provide a portion of the first data to the requestor.

15. The secure element of claim 14, wherein the requestor comprises a user.

16. The secure element of claim 14, wherein the requestor comprises a software application resident on the secure element.

17. The secure element of claim 14, wherein the requestor comprises a software process that is resident on the second access control client.

18. The secure element of claim 14, wherein the request is to merge the first data and the second data, and the processor further causes the secure element to:
- access the second data based on the first privilege level and the requestor privilege level, and
- merge the first data and the second data.

19. The secure element of claim 14, wherein the request is for first contact information of a particular individual, and the processor further causes the secure element to:
- identify an access control client on the secure element to be searched for the first contact information based on the requestor privilege level.

* * * * *